United States Patent [19]
Hanazawa et al.

[11] Patent Number: 5,953,088
[45] Date of Patent: Sep. 14, 1999

[54] LIQUID CRYSTAL DISPLAY WITH SHIELD ELECTRODES ARRANGED TO ALTERNATELY OVERLAP ADJACENT PIXEL ELECTRODES

[75] Inventors: Yasuyuki Hanazawa; Kohei Nagayama, both of Fukaya, Japan

[73] Assignee: Kabushiki Kaisha Toshiba, Kawasaki, Japan

[21] Appl. No.: 09/219,394

[22] Filed: Dec. 23, 1998

[30] Foreign Application Priority Data

Dec. 25, 1997 [JP] Japan .................................. 9-356459

[51] Int. Cl.$^6$ .................... G02F 1/1333; G02F 1/343
[52] U.S. Cl. ..................... 349/110; 349/143; 349/145
[58] Field of Search ................................. 349/110, 140, 349/143, 145, 146

[56] References Cited

U.S. PATENT DOCUMENTS

| | | | |
|---|---|---|---|
| 5,459,596 | 10/1995 | Ueda et al. ................................ | 349/39 |
| 5,822,026 | 10/1998 | Matsuo ..................................... | 349/38 |
| 5,847,792 | 12/1998 | Kobayashi et al. ..................... | 349/110 |

*Primary Examiner*—William L. Sikes
*Assistant Examiner*—Heidi L. Eisenhut
*Attorney, Agent, or Firm*—Pillsbury Madison & Sutro LLP

[57] ABSTRACT

A liquid crystal display device comprises an array substrate including a matrix array of pixel electrodes, scanning lines formed along rows of the pixel electrodes, signal lines formed along columns of the pixel electrodes, and a thin film transistors formed near intersections between the scanning lines and the signal lines and each serving as a switching element selected for applying a drive voltage supplied through a corresponding signal line to a corresponding pixel electrode in response to a selection via a corresponding scanning line, a counter substrate including a counter electrode opposed to the pixel electrodes, and a liquid crystal layer held between the array and counter substrates. The array substrate further includes shield electrodes each of which is capacitively coupled to two pixel electrodes located between two adjacent scanning lines and a signal line located between the two pixel electrodes and is set at a predetermined potential. Each shield electrodes is formed along the one signal line and arranged to alternately overlap one and another of the two adjacent pixel electrodes.

17 Claims, 16 Drawing Sheets

LIQUID CRYSTAL DISPLAY WITH SHIELD ELECTRODES ARRANGED TO ALTERNATELY OVERLAP ADJACENT PIXEL ELECTRODES

BACKGROUND OF THE INVENTION

The present invention relates to a liquid crystal display device in which a plurality of pixel electrodes are partitioned by wiring lines.

In recent years, developments have been actively made to attain a technique of providing a liquid crystal display device having a large screen in which a number of display pixels are arrayed at a high density and which can display a quality image at a high resolution. In particular, active matrix liquid crystal display devices attract a public attention on the grounds that they can display a high-contrast image on a large light-transmission screen, while reducing crosstalk between adjacent pixels. As a result, remarkable progress is observed in the art as compared with that of different types of liquid crystal display devices.

The active matrix liquid crystal display device generally comprises an array substrate which includes a matrix array of pixel electrodes; scanning lines formed along the rows of the pixel electrodes; signal lines formed along the columns of the pixel electrodes; and thin film transistors (TFTs) formed near intersections between the scanning lines and the signal lines and each serving as a switching element for applying a drive voltage supplied through a corresponding signal line to a corresponding pixel electrode in response to a selection via a corresponding scanning line. Each pixel electrode is located along with the corresponding TFT in a region defined by the scanning line and the signal line.

The image quality of the liquid crystal display device is liable to be influenced by a parasitic capacitance corresponding to a capacitive coupling between the signal line and the pixel electrode. Such an influence can be suppressed by using, for example, a storage capacitance line or shield electrode set at a predetermined potential and capacitively coupled to the pixel electrode and the signal line.

However, the use of a storage capacitance line or shield electrodes causes the following problems. The storage capacitance line must be large in size to obtain a capacitance which sufficiently suppresses the influence caused due to the parasitic capacitance described above. The large-sized storage capacitance line decreases the aperture ratio of each pixel. Further, since each pixel electrode is located between two signal lines, two shield electrodes are symmetrically arranged to overlap the signal lines with minimum overlapped areas which do not considerably increase the capacitive loads of the signal lines. In this structure, it is necessary that two shield electrodes on both sides of each signal line be separated from each other by a distance substantially equal to the minimum wiring gap Dmin, as shown in FIG. 2. This decreases the aperture ratio of each pixel.

BRIEF SUMMARY OF THE INVENTION

An object of the present invention is to provide a liquid crystal display device capable of improving the quality of a display image without requiring a decrease in the aperture ratio of the pixel and an increase in the capacitive load of the signal line.

The object is achieved by a liquid crystal display device which comprises: a first substrate including a matrix array of pixel electrodes, a plurality of scanning lines formed along rows of the pixel electrodes, a plurality of signal lines formed along columns of the pixel electrodes, and a plurality of thin film transistors formed near intersections between the scanning lines and the signal lines and each serving as a switching element selected for applying a drive voltage supplied through a corresponding signal line to a corresponding pixel electrode in response to a selection via a corresponding scanning line; a second substrate including a counter electrode opposed to the pixel electrodes; and a liquid crystal layer held between the first and second substrates; wherein the first substrate further includes a plurality of shield electrodes each set at a predetermined potential and capacitively coupled to two adjacent pixel electrodes located between two adjacent scanning lines and one signal line located between the two adjacent pixel electrodes, and each shield electrode is formed along the one signal line and arranged to alternately overlap one and another of the two adjacent pixel electrodes.

In this liquid crystal display device, a single shield electrode overlaps one signal line and two pixel electrodes adjacent to the signal line to have an electrostatic shielding property. Therefore, the width of the signal line can be determined without considering a conventional restrictive factor such as a distance between shield electrodes. Further, since the shield electrode is formed along the signal line and arranged to alternately overlap one and the other of the two pixel electrodes, the width thereof can be reduced to a minimum wiring width Wmin. Thus, it is possible to suppress an increase in the capacitive load of the signal line without impairing the electrostatic shielding property, and obtain a high aperture ratio according to reduction of an area light-shielded by the signal line and the shielding electrode. For this reason, the liquid crystal display device can display a high-quality image in which crosstalk and irregularity of brightness are reduced.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An active matrix liquid crystal display device according to a first embodiment of the present invention will be described with reference to the accompanying drawings.

Figure 4:
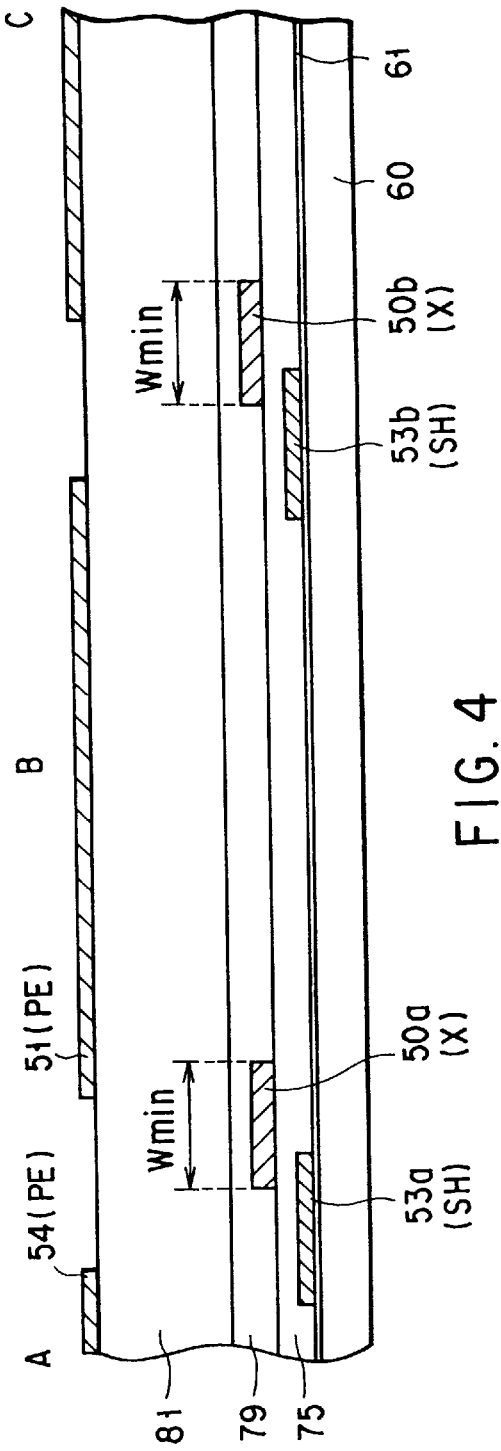
FIG. 4 is a cross-sectional view of the array substrate taken along the line IV—IV in FIG. 3.
Figure 3:
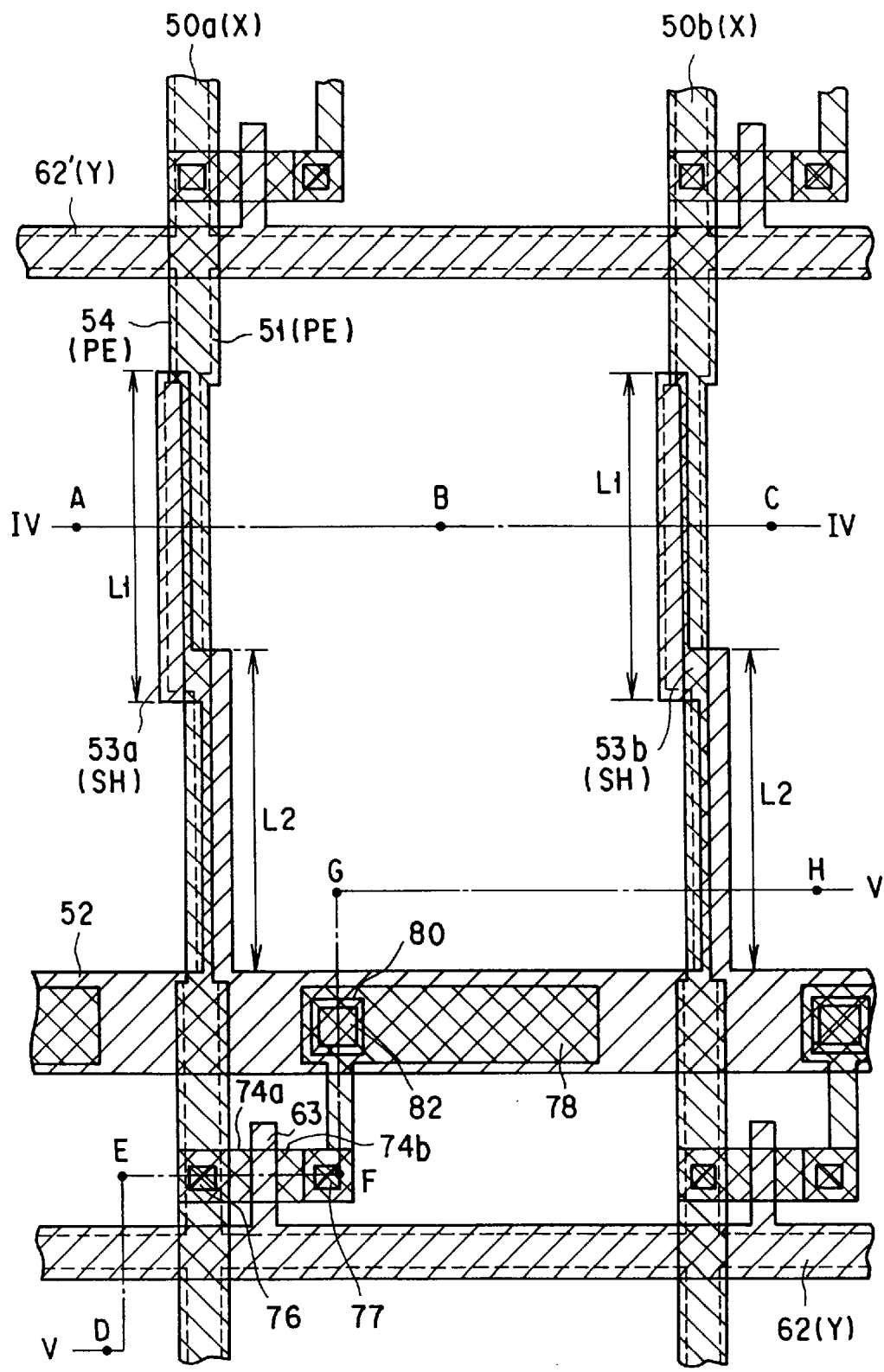
FIG. 3 is a partial plan view showing a pixel wiring structure of an array substrate incorporated in an active matrix liquid crystal display device according to a first embodiment of the present invention.
Figure 5:
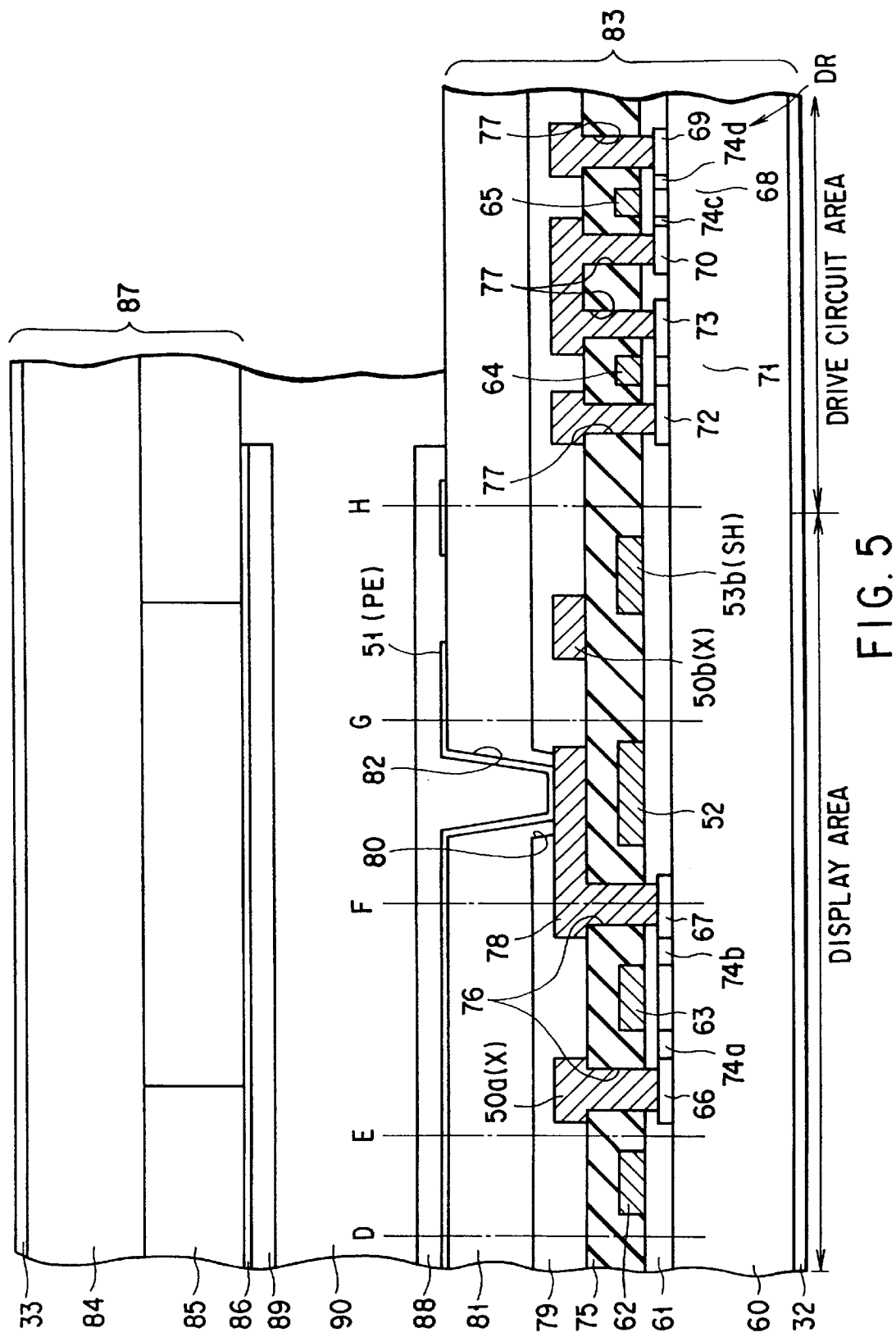
FIG. 5 is a cross-sectional view of the active matrix liquid crystal display device developed along the line V—V in FIG. 3.

FIG. 3 shows a partial plane structure of pixel wirings of an array substrate incorporated in the active matrix liquid crystal display device, FIG. 4 shows a cross-sectional structure of the array substrate taken along the line IV—IV in FIG. 3, and FIG. 5 shows a cross-sectional structure of the active matrix liquid crystal display device developed along the line V—V in FIG. 3.

As shown in FIG. 5, the liquid crystal display device has an array substrate 83, a counter substrate 87 opposed to the array substrate 83, and a liquid crystal layer 90 held between the array substrate 83 and the counter substrate 87. The array substrate 83 comprises a light-transmitting insulation plate 60; a plurality of pixel electrodes PE arrayed in a matrix on the insulation plate 60; a plurality of scanning lines Y formed along the rows of the pixel electrodes PE; a plurality of signal lines X formed along the columns of the pixel electrodes PE; a drive circuit DR for driving the scanning lines Y and the signal lines X; a plurality of thin film transistors TR formed near intersections between the scanning lines and the signal lines and each serving as a switching element for applying a drive voltage supplied through a corresponding signal line X to a corresponding pixel electrode PE in response to a selection via a corresponding scanning line Y; and an alignment film 88 covering all the pixel electrodes PE. The counter substrate 87 includes a light-transmitting insulation plate 84, a counter electrode 86 formed on the insulation plate 84 to face all the pixel electrodes PE, and an alignment film 89 covering the counter electrode 86. The liquid crystal layer 90 is formed in contact with the alignment film 88 of the array substrate 83 and the alignment film 89 of the counter substrate 87.

The array substrate 83 further comprises a plurality of storage capacitance lines 52 each formed across the pixel electrodes PE of a corresponding row in parallel with the scanning lines Y and set at a potential equal to that of the counter electrode 86; and a plurality of shield electrodes SH extending from the storage capacitance lines 52 and each capacitively coupled to a corresponding signal line X and two pixel electrodes PE adjacent to the corresponding signal line X. Each shield electrode SH is formed along the corresponding signal line X and arranged to alternately overlap one and the other of the two adjacent pixel electrodes PE.

In FIG. 3, reference numerals 53a and 53b denote adjacent two of the shield electrodes SH, 51 and 54 adjacent two of the pixel electrodes PE, and 50a and 50b adjacent two of the signal lines X. For example, the shield electrode 53a includes a first portion which overlaps an edge portion of the pixel electrode 54 to electrostatically shield the pixel electrode 54 from the signal line 50a, and a second portion which overlaps an edge portion of the pixel electrode 51 to electrostatically shield the pixel electrode 51 from the signal line 50a. The length L1 of the first portion is equal to the length L2 of the second portion. With this structure, the capacitive coupling between the pixel electrode 51 and the signal line 50a and the capacitive coupling between the pixel electrode 54 and the signal line 50a can be reduced uniformly. As a result, the influence of the parasitic capacitance corresponding to the capacitive coupling can be suppressed to a minimum.

Figure 1:
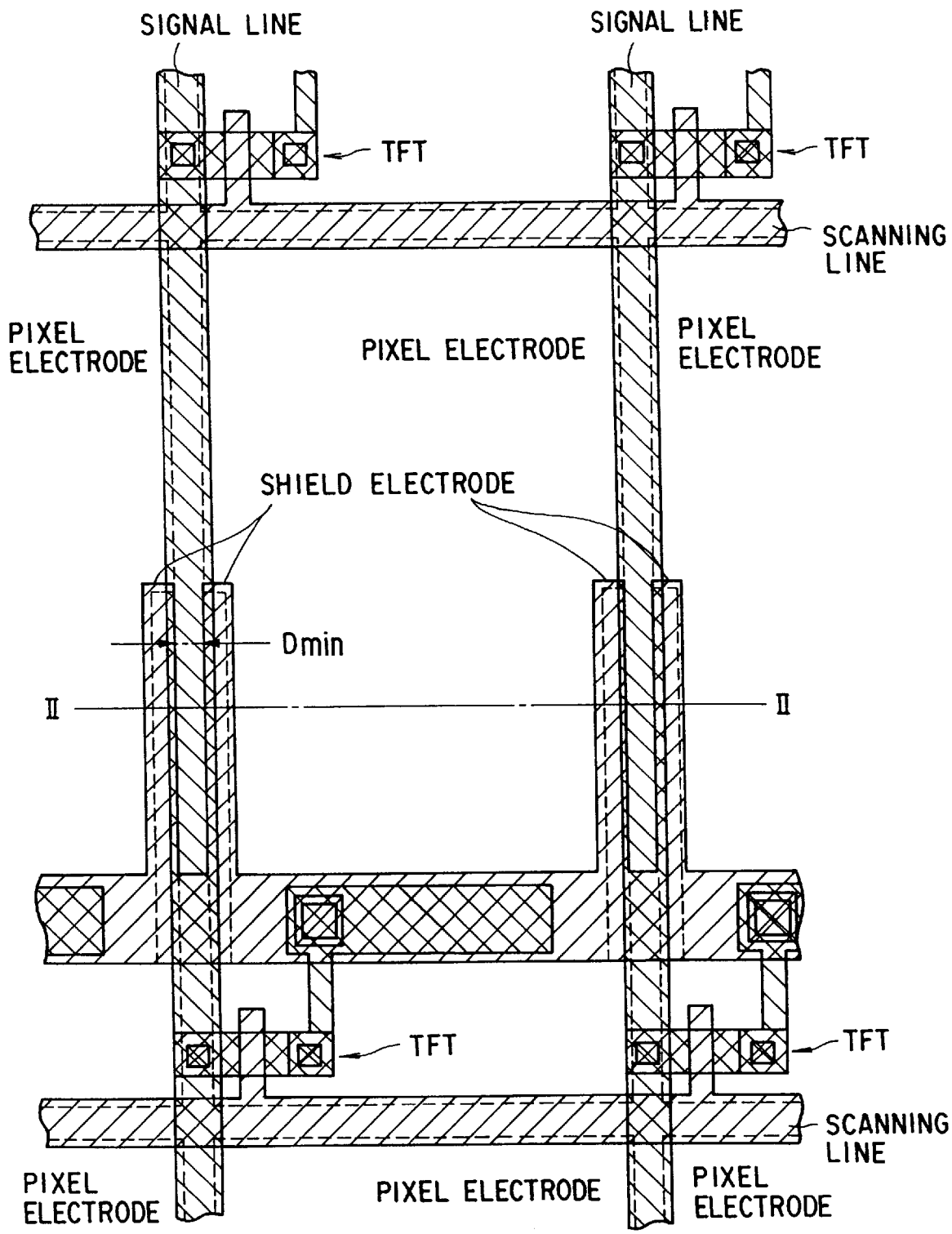
FIG. 1 is a partial plan view showing a pixel wiring structure of an array substrate incorporated in a conventional active matrix liquid crystal display device.
Figure 2:
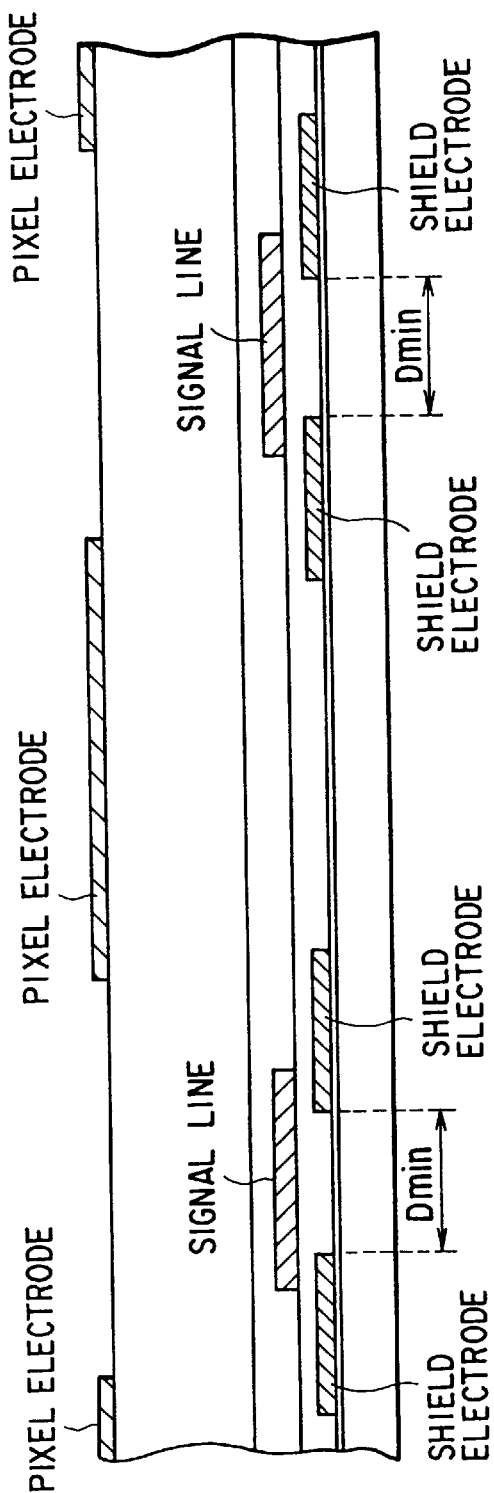
FIG. 2 is a cross-sectional view of the array substrate developed along the line II—II in FIG. 1.

In the conventional structure as shown in FIG. 1, two shield electrodes adjacent to each signal line must be separated from each other by a distance substantially equal to the minimum wiring gap Dmin. Moreover, the signal line must be widen in view of the amount of misalignment which occurs in the manufacturing process to securely overlap the two shield electrodes and prevent leakage of light. This results in a decrease of the aperture ratio of each pixel.

In contrast, in the liquid crystal display device of this embodiment, since a single shield electrode SH overlaps two pixel electrodes PE adjacent to a signal line X, the width of the signal line X can be determined without considering a conventional restrictive factor such as a distance between shield electrodes. Further, since the shield electrode SH is formed along the signal line X and arranged to alternately overlap one and the other of the two adjacent pixel electrodes PE, the width thereof can be reduced to a minimum wiring width Wmin. Thus, a high aperture ratio can be obtained without impairing the electrostatic shielding property.

A method for manufacturing the above-mentioned liquid crystal display device will now be described with reference to FIG. 5. FIG. 5 shows a cross-sectional structure of the liquid crystal display device developed along the line V—V in FIG. 3.

In the manufacturing step of an array substrate 83, an amorphous silicon (a-Si) film is deposited by the CVD method on a light-transmitting insulation plate 60 (e.g., a quartz or high distortion-point glass plate) to a thickness of about 50 nm, and hearth-annealed at 450° C. for an hour. Then, XeCl excimer laser is irradiated on the amorphous silicon film to crystallize it into a polycrystalline silicon film. The polycrystalline silicon film thus obtained is patterned by photo-etching to form semiconductor layers for pixel-use thin film transistors TR to be disposed in a display region of the substrate 60 and for driver-use thin film transistors 68 and 71 to be disposed outside the display region. Subsequently, an about 100–150 nm thick silicon oxide ($SiO_x$) film is deposited by CVD method to form a gate insulation film 61 covering the semiconductor layers and the insulation plate 60.

Then, a scanning line 62 (Y), a storage capacitance line 52, a gate electrode 63 of the pixel-use thin film transistor TR, gate electrodes 64 and 65 of the driver-use thin film transistors 68 and 71, and wiring layers of the driver-use thin film transistors 68 and 71 are formed. They are obtained by entirely covering the gate insulation film 61 with an about 200–400 nm thick film formed of a single layer of Ta, Cr, Al, Mo, W or Cu, or a laminated or alloy layer of at least two of these metals, and patterning the resultant film into predetermined shapes by photo-etching. In this process, shield electrodes 53a and 53b of a predetermined shapes are also formed.

Thereafter, an impurity is doped by an ion-implantation process or an ion-doping process using the gate electrodes 63, 64 and 65 as masks. In this embodiment, phosphorus is accelerated at an acceleration voltage of, for example, 80 keV in a $PH_3/H_2$ atmosphere and implanted at a high concentration of a dose of $5\times10^{15}$ atom/cm$^2$ so as to form a drain region 66 and a source region 67 of the pixel-use thin film transistor TR and a source region 69 and a drain region 70 of an N-channel driver-use thin film transistor 68.

Then, the pixel-use thin film transistor TR and the N-channel driver-use thin film transistor 68 are covered with resist which prevents impurity from being implanted therein. Thereafter, an impurity is doped with the gate electrode 64 of the P-channel driver-use thin film transistor 71 used as a mask. In this embodiment, boron is accelerated at an acceleration voltage of 80 keV in a $B_2H_6/H_2$ atmosphere and implanted at a high concentration of a dose of $5\times10^{15}$ atom/cm$^2$ so as to form a source region 72 and a drain region 73 of the P-channel driver-use thin film transistor 71. Then, an impurity is further implanted so as to form N-channel LDDs (Lightly Doped Drains) 74a, 74b, 74c and 74d, and activated by annealing the substrate.

Further, an interlayer insulating film 75 of $SiO_2$ is deposited to a thickness of about 500 nm to 700 nm by the PECVD method so as to cover the overall structure on the insulation plate. Subsequently, a photo-etching process is performed in order to form contact holes 76 exposing the drain region 66 and the source region 67 of the pixel-use thin film transistor TR and contact holes 77 exposing the source regions 69 and 72 and the drain regions 70 and 73 of the driver-use thin film transistors 68 and 71.

Thereafter, signal lines 50a and 50b, a drain electrode connected between the signal line 50a and the drain region 66 of the pixel-use thin film transistor TR, a source electrode connected to the source region 67 and serving as an upper electrode 78 of the storage capacitance element, and wiring layers for the driver-use thin film transistors 71 and 68 are formed. They are obtained by entirely covering the interlayer insulating film 75 with an about 500–700 nm thick film formed of a single layer of Ta, Cr, Al, Mo, W or Cu, or a laminated or alloy layer of at least two of these metals, and patterning the resultant film into predetermined shapes by photo-etching. Subsequently, a transparent dielectric protection film 79 made of SiNx is formed by the PECVD method to entirely cover the structure on the insulation plate 60. Then, a contact hole 80 is formed by the photo-etching so as to expose the upper electrode 78 of the storage capacitance element.

Thereafter, an organic insulation film 81 of a thickness of 2 μm to 4 μm is formed to cover the overall surface of the protection film 79, and a contact hole 82 is formed in the film 81 to expose the upper electrode 78 of the storage capacitance element.

Finally, a transparent conductive material such as ITO is deposited by the sputtering to a thickness of about 100 nm and patterned to a predetermined shape by the photo-etching, thereby forming a pixel electrode 51 (PE) which contacts the upper electrode 78 of the storage capacitance element. The array substrate 83 is completed by the processes described above.

In the manufacturing step of the counter substrate 87, a colored layer 85, in which a pigment or the like is dispersed, is formed on a light-transmitting insulation plate 84, such as a glass plate. Further, a transparent conductive material such as ITO is deposited by sputtering to form a counter electrode 86 on the colored layer 85. The counter substrate 87 is completed through the processes described above.

Subsequently, the pixel electrode 51 of the array substrate 83 and the counter electrode 86 of the counter substrate 87 are entirely coated with a low-temperature cure type polyimide by printing. The covered films are subjected to a rubbing process, so that the alignment axes thereof make an angle of 90° when the films are opposed to each other, thereby forming alignment films 88 and 89. The substrates 83 and 87 are adjoined such that the alignment films 88 and 89 face each other, and the peripheries of the substrates are adhered so that a cell can be formed in a gap between the alignment films 88 and 89. Further, nematic liquid crystal 90 is injected into the cell. After the cell is sealed, polarization films 32 and 33 are adhered to the opposite surfaces of the substrates 83 and 87 from the alignment films 88 and 89. Thus, a liquid crystal display device is completed.

In the liquid crystal display device thus obtained, single shield electrode SH overlaps one signal line X and two pixel electrodes PE adjacent to the signal line X to have an electrostatic shielding property. Therefore, the width of the signal line X can be determined without considering a conventional restrictive factor such as a distance between shield electrodes. Further, since the shield electrode SH is formed along the signal line X and arranged to alternately overlap one and the other of the two pixel electrodes PE, the width thereof can be reduced to a minimum wiring width Wmin. Thus, it is possible to suppress an increase in the capacitive load of the signal line X without impairing the electrostatic shielding property, and obtain a high aperture ratio according to reduction of an area light-shielded by the signal line X and the shielding electrode SH. For this reason, the liquid crystal display device can display a high-quality image in which crosstalk and irregularity of brightness are reduced.

Figure 6:
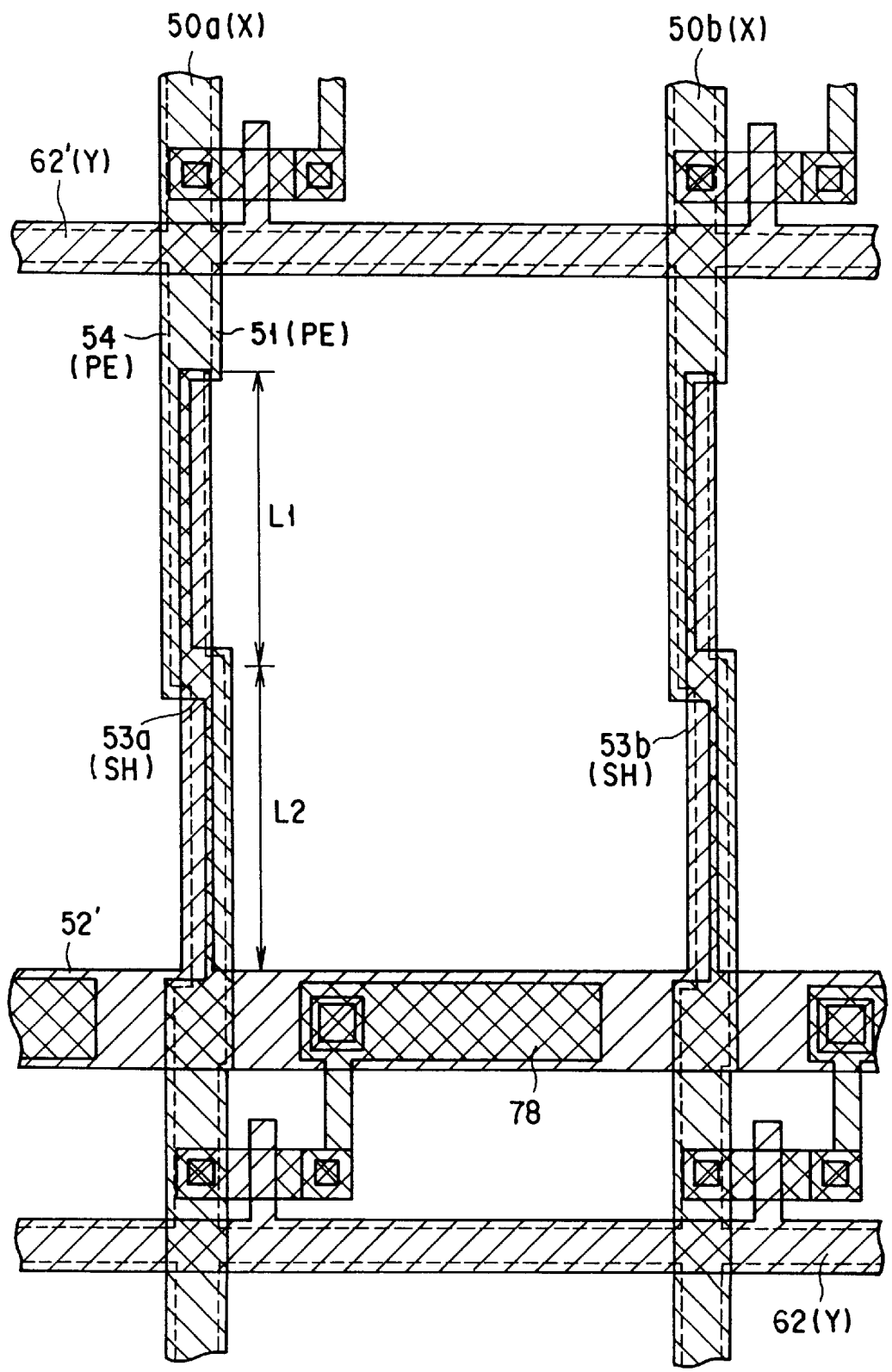
FIG. 6 is a plan view showing a first modification of the pixel wiring structure shown in FIG. 3.

FIG. 6 shows a modification in which a signal line X is formed in a crank-shape, instead of a shield electrode SH. With this structure, the same effect as that of the above embodiment can be obtained.

Figure 7:
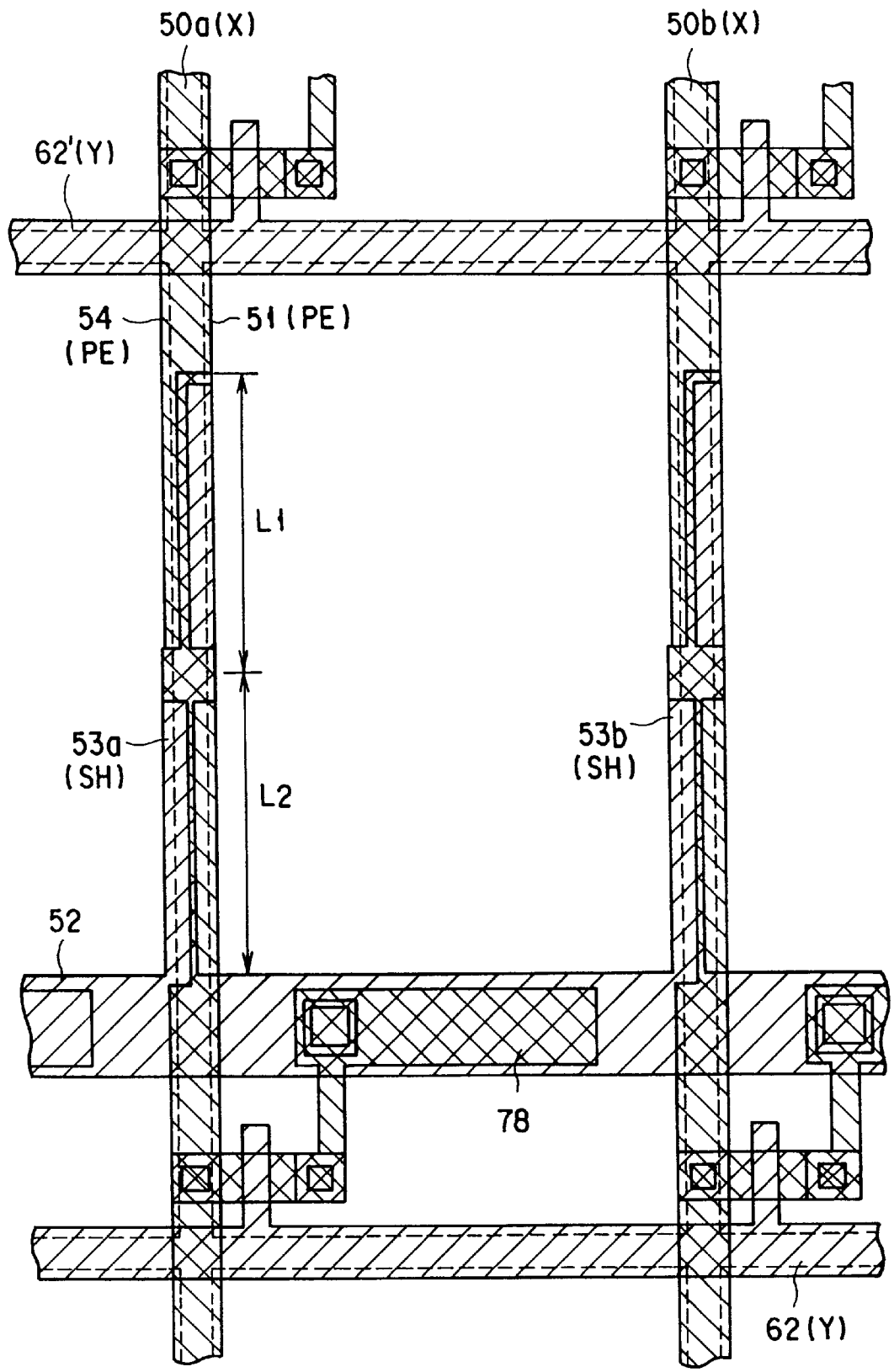
FIG. 7 is a plan view showing a second modification of the pixel wiring structure shown in FIG. 3.
Figure 8:
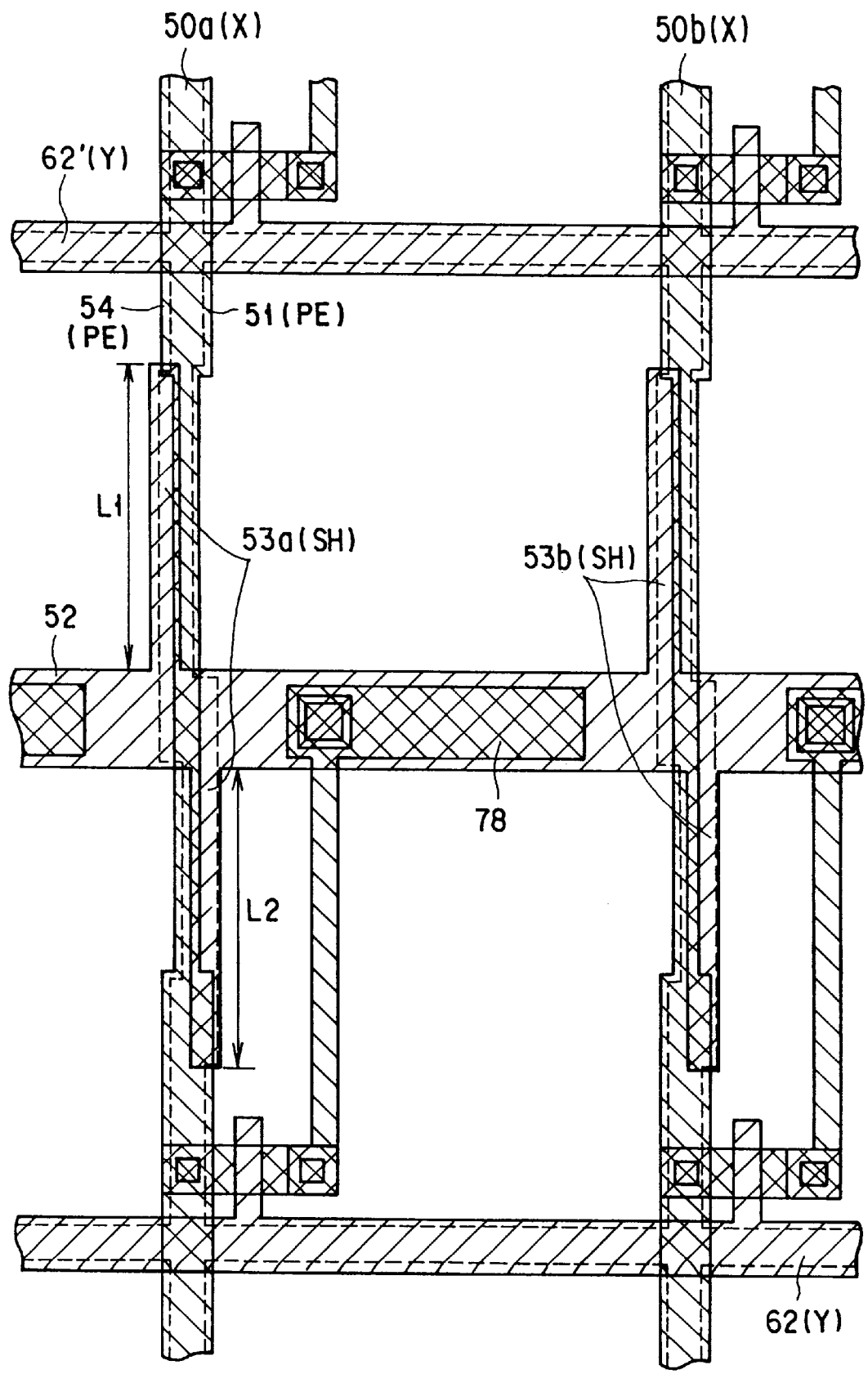
FIG. 8 is a plan view showing a third modification of the pixel wiring structure shown in FIG. 3.

FIG. 7 shows a modification in which both a shield electrode SH and a signal line X are formed in a crank-shape. With this structure, a higher aperture ratio of the pixel can be obtained. Further, as shown in FIG. 8, a shield electrode SH may be formed to extend on both sides of the storage capacitance line 52 along the signal line X. In this case also, the same effect as in the above embodiment can be obtained.

Figure 9:
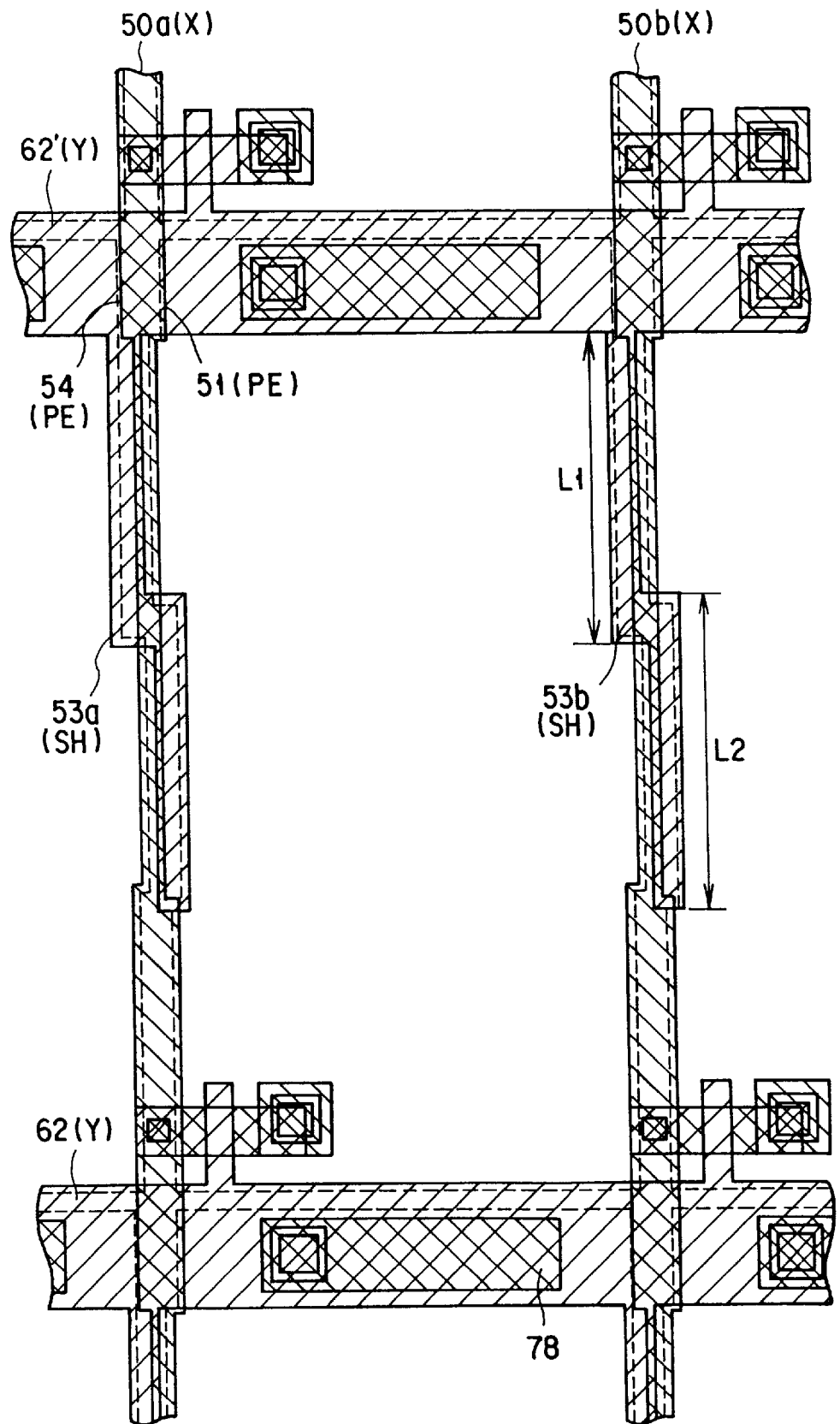
FIG. 9 is a plan view showing a fourth modification of the pixel wiring structure shown in FIG. 3.

FIG. 9 shows a modification in which the shield electrode SH in FIG. 3 is formed to extend from a preceding scanning line Y (62'). The scanning line, Y (62') is adjacent to the scanning line Y (62) for driving the pixel electrodes PE (51, 54) and set at a potential equal to that of a counter electrode 86 to serve as a storage capacitance line at a time of driving the pixel electrodes PE (51, 54). With this structure, a higher aperture ratio can be obtained since the storage capacitance line 52 is not required.

An active matrix liquid crystal display device according to a second embodiment of the present invention will be described with reference to the drawings.

Figure 10:
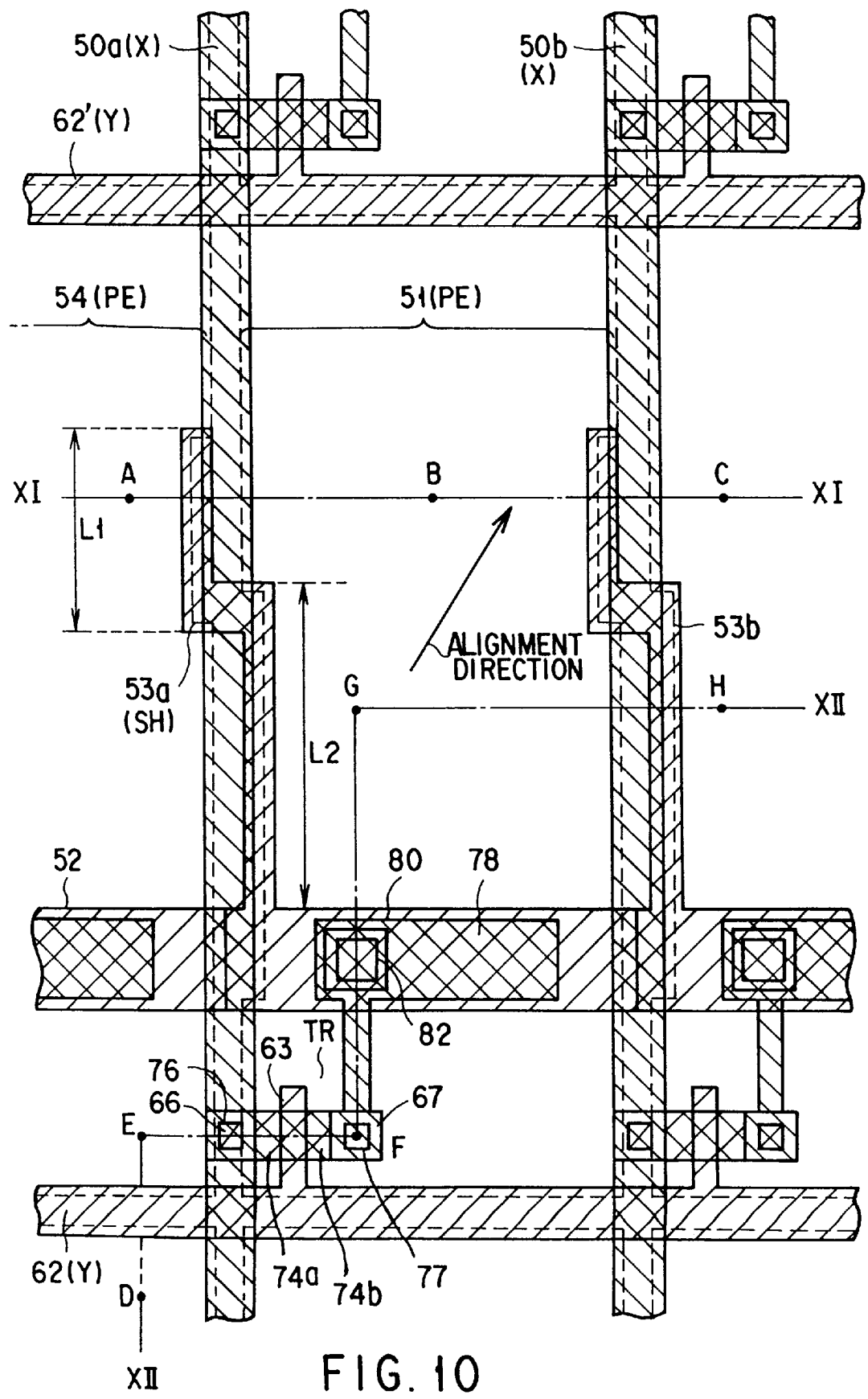
FIG. 10 is a partial plan view showing a pixel wiring structure of an array substrate incorporated in an active matrix liquid crystal display device according to a second embodiment of the present invention.
Figure 11:
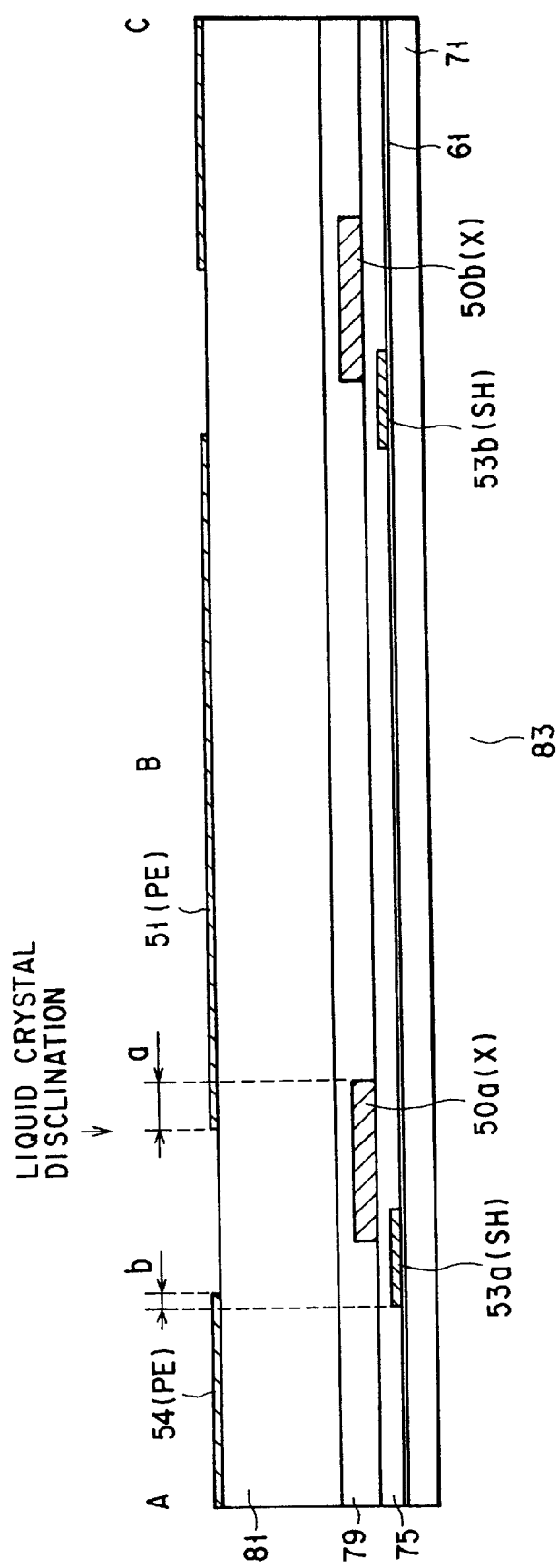
FIG. 11 is a cross-sectional view of the array substrate taken along the line XI—XI in FIG. 10.
Figure 12:
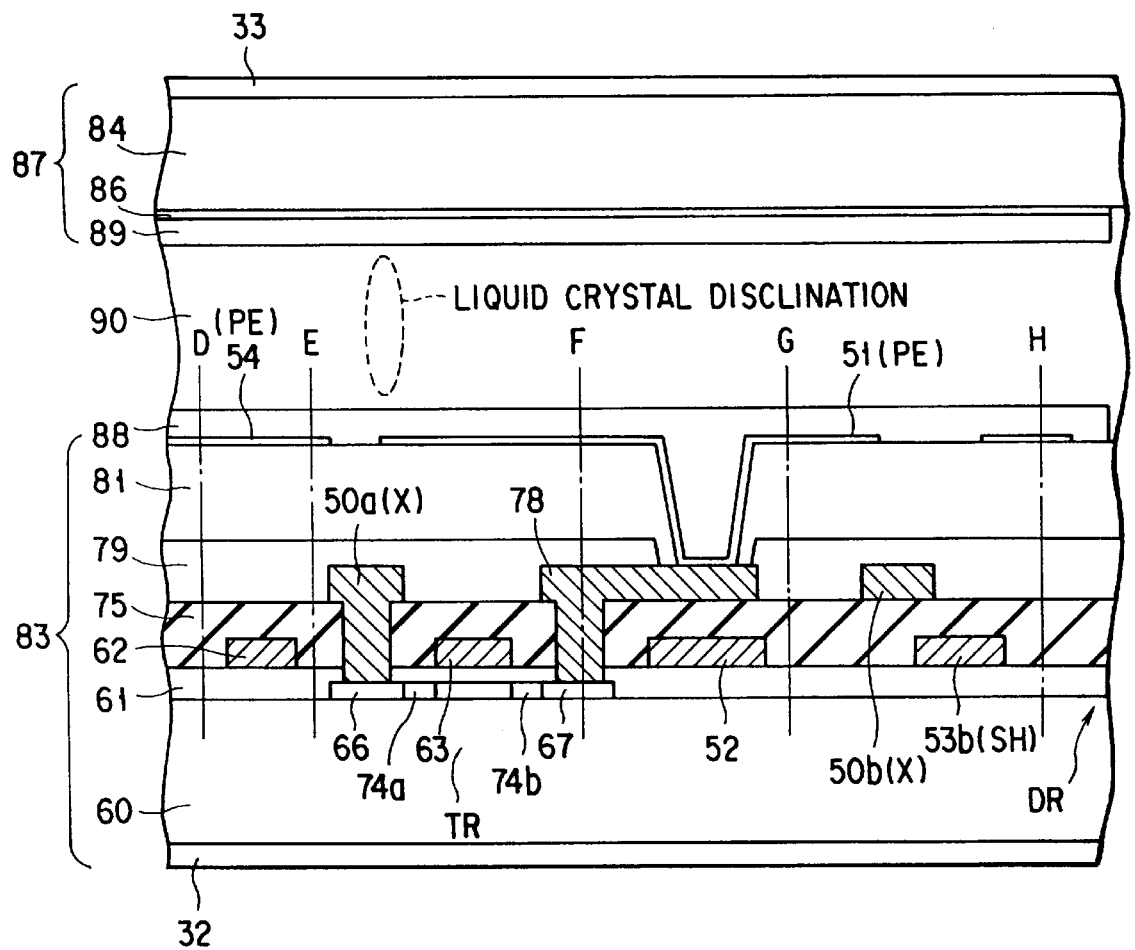
FIG. 12 is a cross-sectional view of the active matrix liquid crystal display device developed along the line XII—XII in FIG. 10.

FIG. 10 shows a partial plane structure of pixel wirings of an array substrate incorporated in the active matrix liquid crystal display device; FIG. 11 shows a cross-sectional structure of the array substrate taken along the line XI—XI in FIG. 10; and FIG. 12 shows a cross-sectional structure of the active matrix liquid crystal display device taken along the line XII—XII in FIG. 10. The liquid crystal display device is the same as that of the first embodiment except for the points described below. Therefore, the portions similar to those of the first embodiment are represented by the same reference numerals as those of the first embodiment, and descriptions thereof are omitted or simplified.

The liquid crystal display device comprises an array substrate 83, a counter substrate 87 and a liquid crystal layer 90 as in the first embodiment. The array substrate 83 includes an insulation plate 60, a plurality of pixel electrodes PE, a plurality of scanning lines Y, a plurality of signal lines X, a driver circuit DR, a plurality of thin film transistors TR and an alignment film 88. The counter substrate 87 includes an insulation plate 84, a counter electrode 86 and an alignment film 89. The liquid crystal layer 90 is formed in contact with the alignment films 88 and 89.

The array substrate 83 further comprises a plurality of storage capacitance lines 52 each formed across the pixel electrodes PE of a corresponding row in parallel with the scanning lines Y and set at a predetermined potential, and a plurality of shield electrodes SH extending from the storage capacitance lines 52 and each capacitively coupled to a corresponding signal line X and two pixel electrodes PE adjacent to the corresponding signal line X. Each shield electrode SH is formed along the corresponding signal line X and arranged to alternately overlap one and the other of the two adjacent pixel electrodes PE.

In FIG. 10, reference numerals 53*a* and 53*b* denote adjacent two of the shield electrodes SH, 51 and 54 adjacent two of the pixel electrodes PE, and 50*a* and 50*b* adjacent two of the signal lines X. For example, the shield electrode 53*a* includes a first portion which overlaps an edge portion of the pixel electrode 54 to electrostatically shield the pixel electrode 54 from the signal line 50*a*, and a second portion which overlaps an edge portion of the pixel electrode 51 to electrostatically shield the pixel electrode 51 from the signal line 50*a*. The second portion also serves as a light shielding member for masking a liquid crystal disclination region which occurs according to the alignment direction of the alignment film 88 indicated by the arrow in FIG. 10. The length L1 and the width b of the first portion and the length L2 and the width a of the second portion are adjusted to uniformly reduce the capacitive coupling between the pixel electrode 51 and the signal line 50*a* and the capacitive coupling between the pixel electrode 54 and the signal line 50*a*, so that the influence of the parasitic capacitance corresponding to these capacitive coupling can be suppressed to a minimum and the light transmitted through the liquid crystal disclination region can be shielded without failure.

In the array substrate 83, the shield electrode SH is widen according to the liquid crystal disclination region. Therefore, an increase in the parasitic capacitance between the pixel electrode 51 and the signal line 50*a*, the parasitic capacitance between the pixel electrode 54 and the signal line 50*a* and the capacitive load of the signal line 50*a* can be suppressed to a minimum, while the light transmitted through the liquid crystal disclination region is surely shielded. Moreover, since the parasitic capacitance between the pixel electrode 51 and the signal line 50*a* is substantially equal to the parasitic capacitance between the pixel electrode 51 and the signal line 50*b*, the liquid crystal display device can display a high-quality image in which crosstalk and irregularity of brightness are reduced.

Figure 13:
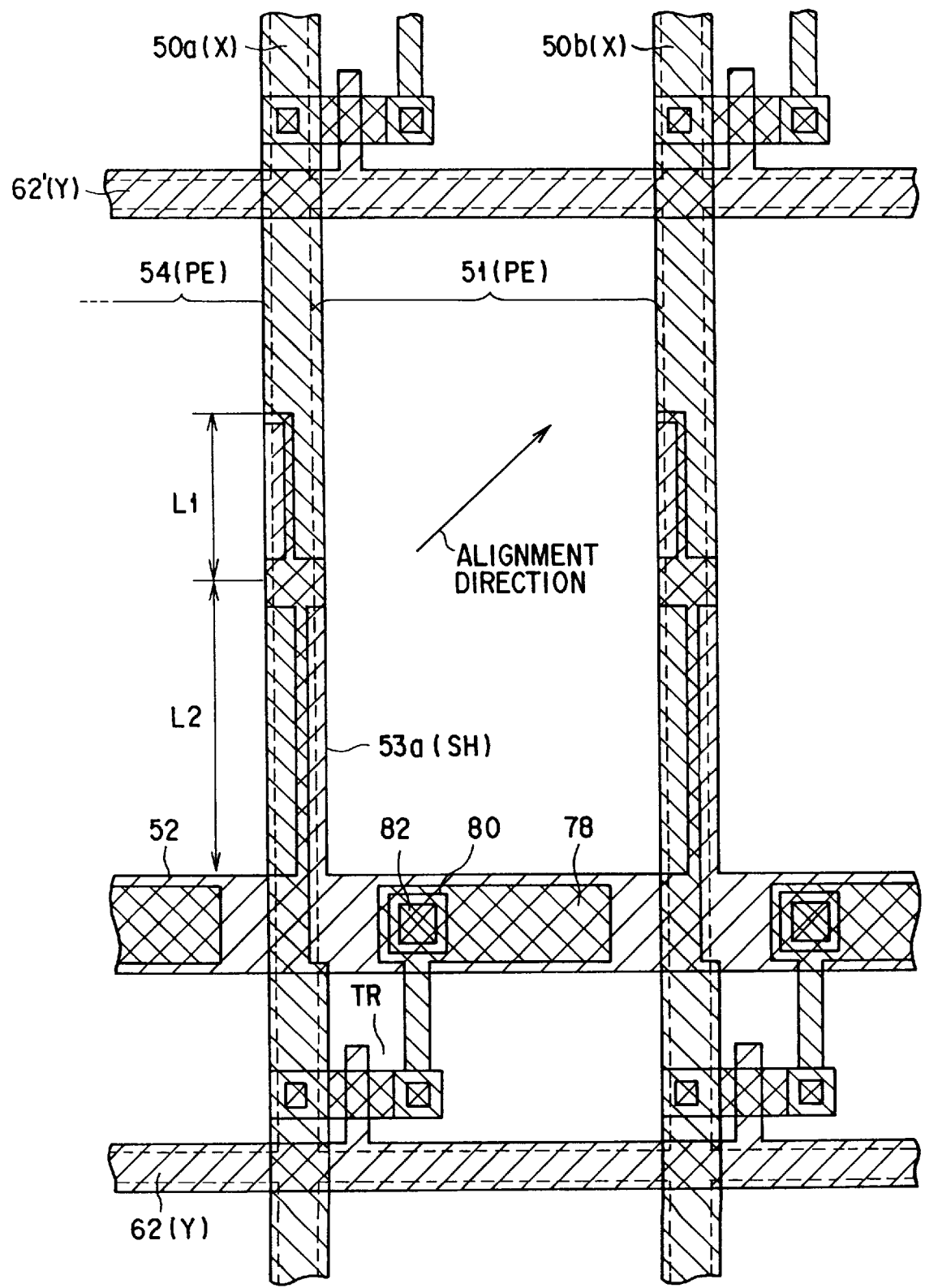
FIG. 13 is a plan view showing a first modification of the pixel wiring structure shown in FIG. 10.

FIG. 13 shows a modification in which a signal line X is formed in a crank-shape, instead of a shield electrode SH. With this structure, the same effect as that of the above embodiment can be obtained.

Figure 14:
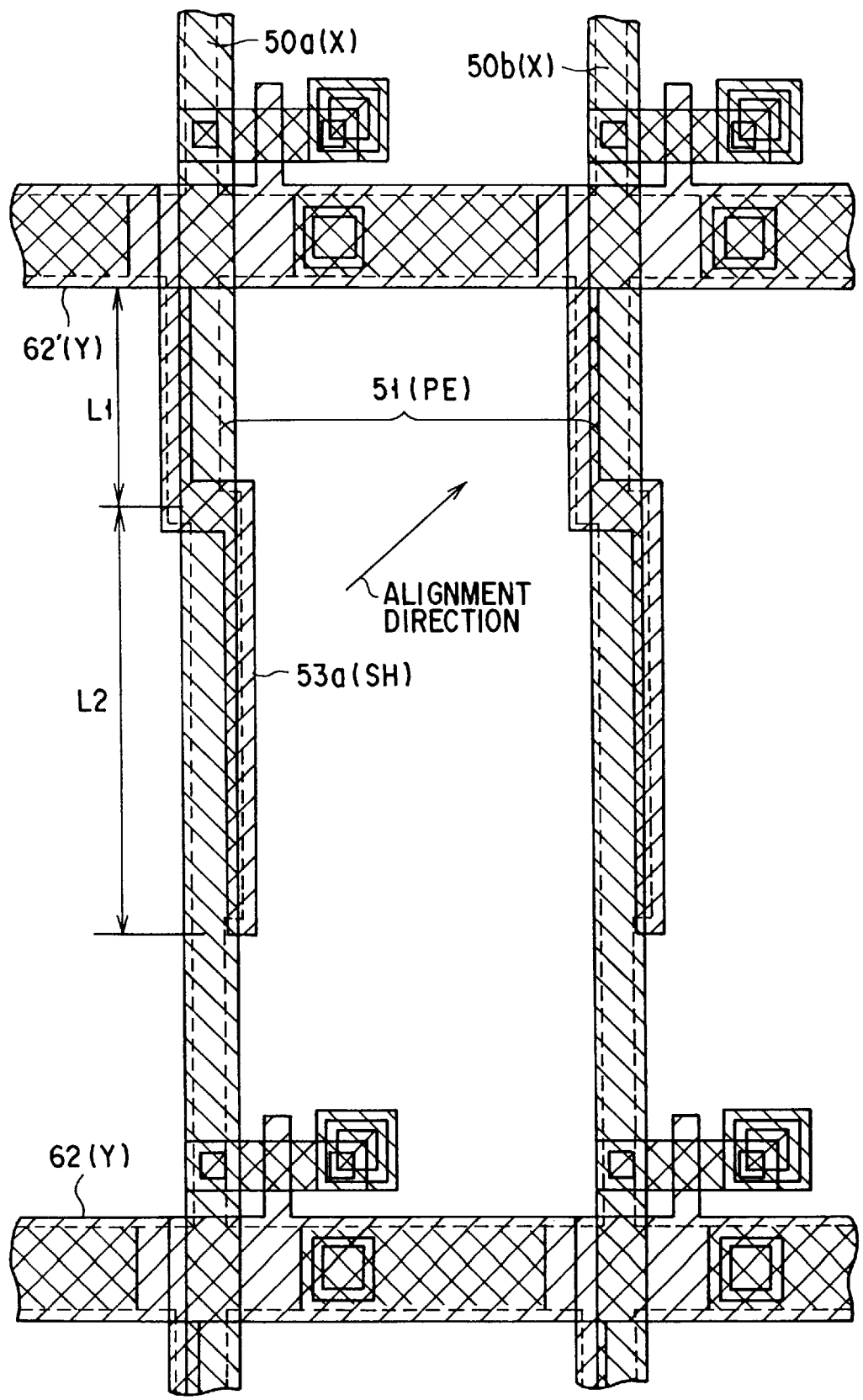
FIG. 14 is a plan view showing a second modification of the pixel wiring structure shown in FIG. 10.

FIG. 14 shows a modification in which the shield electrode SH in FIG. 3 is formed to extend from a preceding scanning line Y (62'). The scanning line Y (62') is adjacent to the scanning line Y (62) for driving the pixel electrodes PE (51, 54) and set at a potential equal to that of a counter electrode 86 to serve as a storage capacitance line at a time of driving the pixel electrodes PE (51, 54). With this structure, a higher aperture ratio can be obtained since the storage capacitance line 52 is not required.

Figure 15:
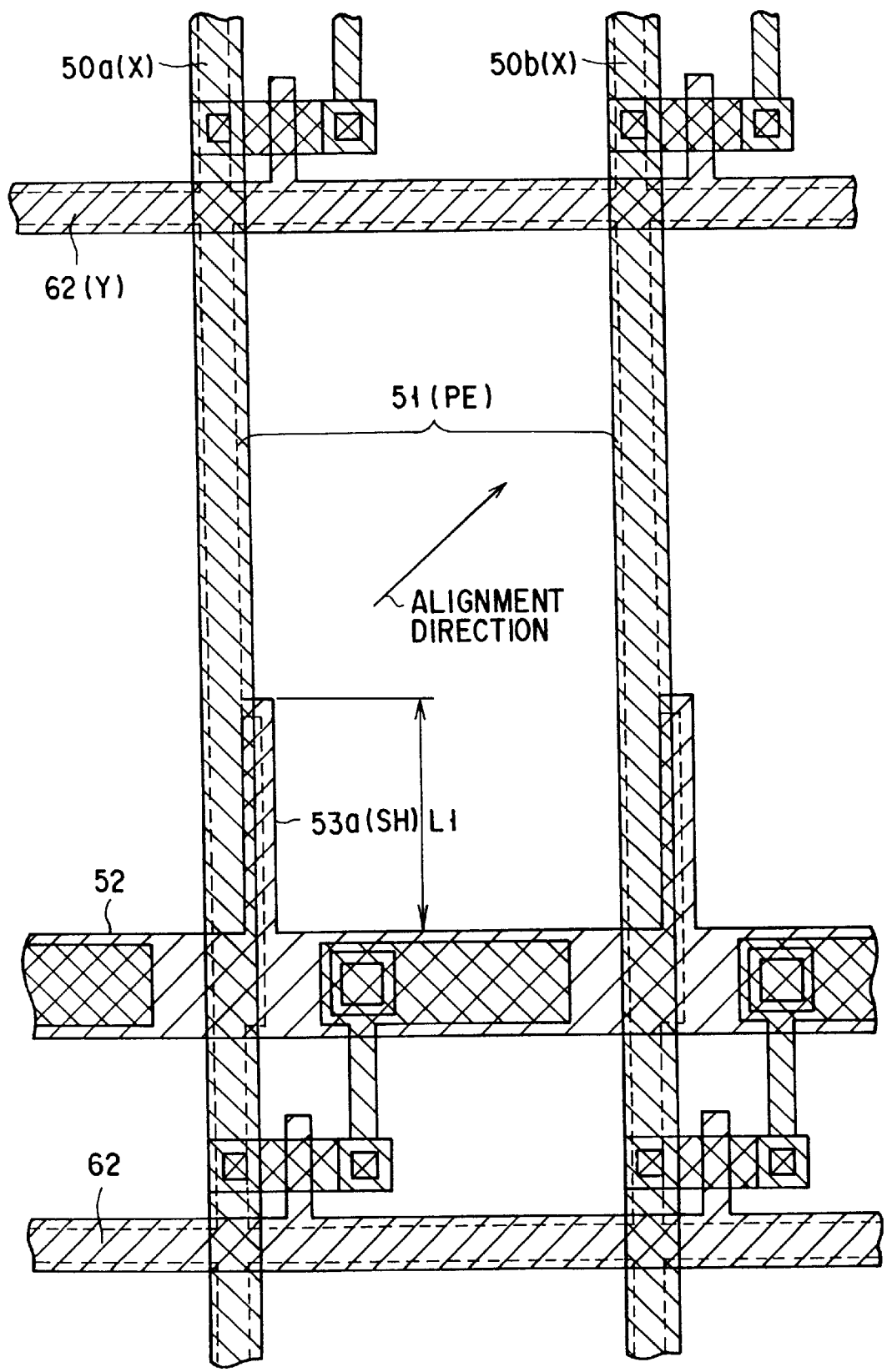
FIG. 15 is a plan view showing a third modification of the pixel wiring structure shown in FIG. 10.

FIG. 15 shows a modification in which a shield electrode SH is formed to extend from a storage capacitance line 52 on one side of a signal line X so as to mask a liquid crystal disclination region. The length L1 of the shield electrode SH is adjusted to equalize the influences of the two signal lines X (50*a* and 50*b*) adjacent to a pixel electrode PE (51). As a result, the same effect as that of the embodiment shown in FIG. 10 can be obtained.

Figure 16:
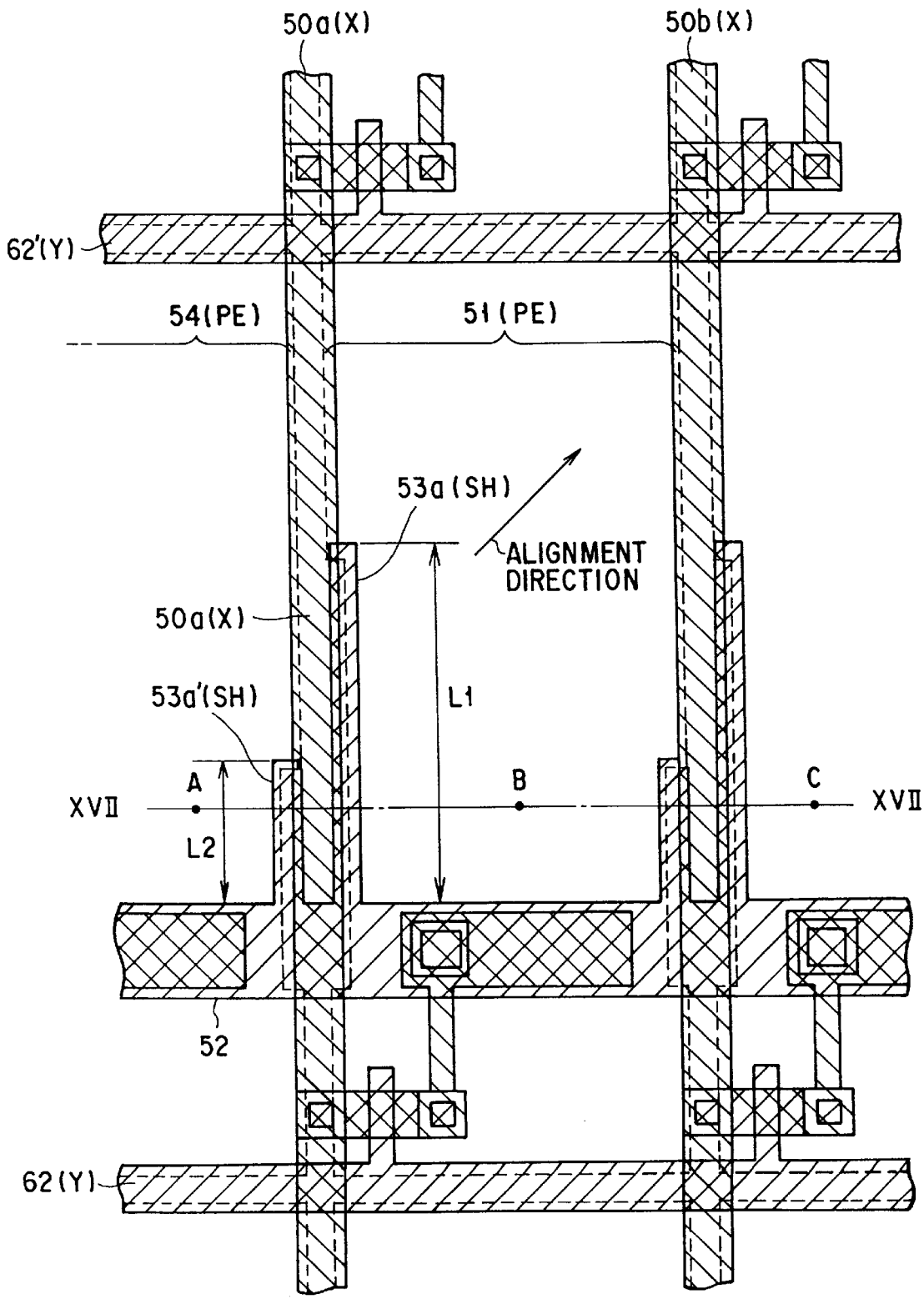
FIG. 16 is a plan view showing a fourth modification of the pixel wiring structure shown in FIG. 10.
Figure 17:
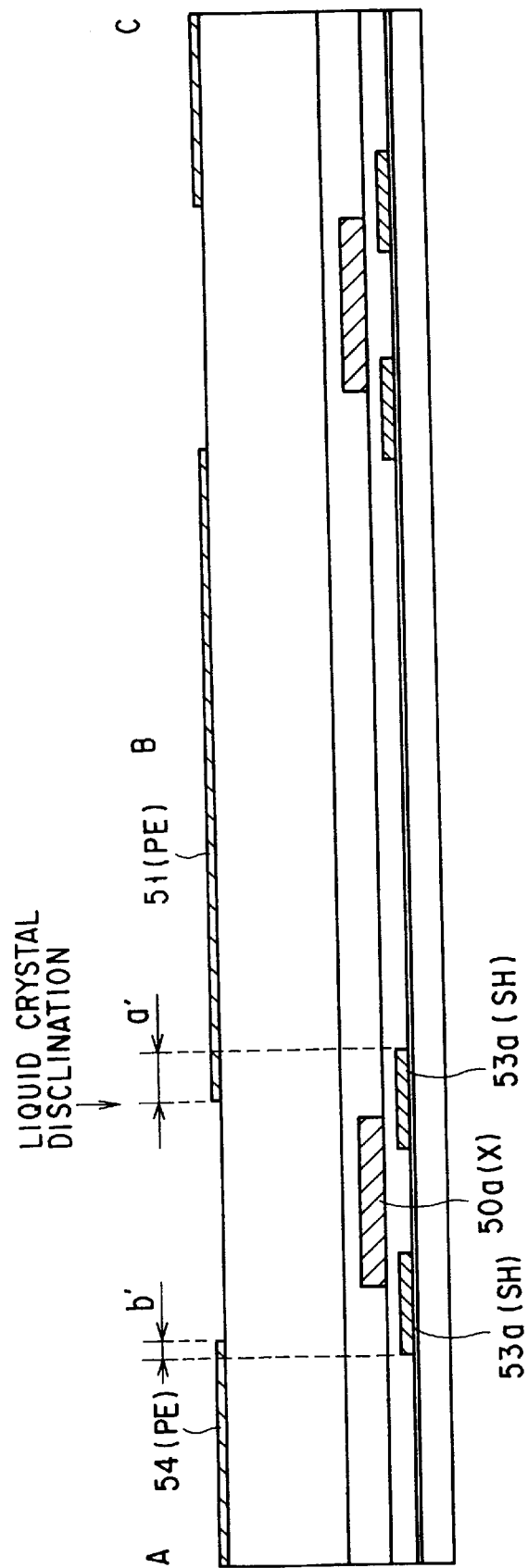
FIG. 17 is a cross-sectional view of an array substrate developed along the line XVII—XVII in FIG. 16.

FIG. 16 shows a modification in which first and second shield electrodes SH (53*a* and 53*a'*) are extended from a storage capacitance line 52 on both sides of a signal line X. The length L1 of the first shield electrode SH (53*a*) differs from the length L2 of the second shield electrode SH (53*a'*). Further, as shown in FIG. 17, the first shield electrode SH (53*a*) includes a portion which has a width a' and overlaps the pixel electrode PE (51), and the second shield electrode SH (53*a'*) includes a portion which has a width b' different from the width a' and overlaps the pixel electrode PE (54). With this structure also, the same effect as in the embodiment shown in FIG. 10 can be obtained.

In the active matrix liquid crystal display devices of the above embodiments, a thin film transistor is formed using a semiconductor layer of polycrystalline silicon. The present invention is also applicable to a liquid crystal display device which is formed using a semiconductor layer, for example, of amorphous silicon. In this case also, the same effect as in the embodiments described above can be obtained.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:

1. A liquid crystal display device comprising:
   a first substrate including:
   a matrix array of pixel electrodes,
   a plurality of scanning lines formed along rows of said pixel electrodes,
   a plurality of signal lines formed along columns of the pixel electrodes, and
   a plurality of thin film transistors formed near intersections between said scanning lines and said signal lines;

a second substrate including a counter electrode opposed to said pixel electrodes; and a liquid crystal layer held between said first and second substrates;

wherein said first substrate further includes a plurality of shield electrodes each set at a predetermined potential and capacitively coupled to two adjacent pixel electrodes located between two adjacent scanning lines and one signal line located between the two adjacent pixel electrodes, and each shield electrode is formed along the one signal line and arranged to alternately overlap one and another of the two adjacent pixel electrodes.

2. A liquid crystal display device according to claim 1, wherein said shield electrode includes a first overlap portion which is deviated toward one of said adjacent pixel electrodes and a second overlap portion which is deviated toward another one of said adjacent pixel electrodes.

3. A liquid crystal display device according to claim 1, wherein said one signal line is formed in a non-linear shape and includes a first overlap portion which is deviated toward one of said adjacent pixel electrodes and a second overlap portion which is deviated toward another one of said adjacent pixel electrodes.

4. A liquid crystal display device according to claim 2, wherein said one signal line is formed in a non-linear shape and includes a first overlap portion which is associated with the second overlap portion of said shield electrode and deviated toward the one of said adjacent pixel electrodes and a second overlap portion which is associated with the first overlap portion of said shield electrode and deviated toward the other one of said adjacent pixel electrodes.

5. A liquid crystal display device according to claim 1, wherein said shield electrode is set at a potential equal to that of said counter electrode to form a storage capacitance for said adjacent pixel electrodes.

6. A liquid crystal display device according to claim 5, wherein said shield electrode extends from a storage capacitance line formed in parallel with said adjacent scanning lines.

7. A liquid crystal display device according to claim 5, wherein said shield electrode extends from one of said adjacent scanning lines which is set at a potential equal to that of said counter electrode and serves as a storage capacitance line when said adjacent pixel electrodes are driven via the other one of said adjacent scanning lines.

8. A liquid crystal display device according to claim 1, wherein said one signal line is associated with said shield electrode to form a light-shielding member which masks a liquid crystal disclination region present on a side corresponding to one of said adjacent pixel electrodes.

9. A liquid crystal display device according to claim 8, wherein said shield electrode includes a first overlap portion which is deviated toward one of said adjacent pixel electrodes and a second overlap portion which is deviated toward another one of said adjacent pixel electrodes, and the length and width of said first overlap portion of said shield electrode differ from those of said second overlap portion of said shield electrode.

10. A liquid crystal display device according to claim 8, wherein said one signal line is formed in a non-linear shape and includes a first overlap portion which is deviated toward one of said adjacent pixel electrodes and a second overlap portion which is deviated toward another one of said adjacent pixel electrodes, and the length and width of said first overlap portion of said one signal line differ from those of said second overlap portion of said one signal line.

11. A liquid crystal display device according to claim 9, wherein said one signal line is formed in a non-linear shape and includes a first overlap portion which is associated with the second overlap portion of said shield electrode and deviated toward the one of said adjacent pixel electrodes and a second overlap portion which is associated with the first overlap portion of said shield electrode and deviated toward the other one of said adjacent pixel electrodes, and the length and width of said first overlap portion of said one signal line differ from those of said second overlap portion of said one signal line.

12. A liquid crystal display device according to claim 11, wherein said light-shielding member is formed in a linear shape by a combination of said one signal line and said shield electrode.

13. A liquid crystal display device according to claim 8, wherein said shield electrode extends from one of said adjacent scanning lines which is set at a potential equal to that of said counter electrode and serves as a storage capacitance line when said adjacent pixel electrodes are driven via the other one of said adjacent scanning lines.

14. A liquid crystal display device comprising:
a first substrate including:
a matrix array of pixel electrodes,
a plurality of scanning lines formed along rows of said pixel electrodes,
a plurality of signal lines formed along columns of the pixel electrodes, and
a plurality of thin film transistors formed near intersections between said scanning lines and said signal lines;
a second substrate including a counter electrode opposed to said pixel electrodes; and
a liquid crystal layer held between said first and second substrates;
wherein said first substrate further includes a plurality of shield electrodes each formed along one signal line and arranged to alternately overlap one and another of two adjacent pixel electrodes which are located between two adjacent scanning lines and between the two adjacent pixel electrodes, each shield electrode is associated with said one signal line to form a light-shielding member which shields light transmitted through a gap between said adjacent pixel electrodes, and said shield electrode is formed to mask a liquid crystal disclination region present on a side corresponding to one of said adjacent pixel electrodes.

15. A liquid crystal display device according to claim 14, wherein said shield electrode extends from a storage capacitance line formed in parallel with said adjacent scanning lines.

16. A liquid crystal display device comprising:
a first substrate including:
a matrix array of pixel electrodes,
a plurality of scanning lines formed along rows of said pixel electrodes,
a plurality of signal lines formed along columns of the pixel electrodes, and
a plurality of thin film transistors formed near intersections between said scanning lines and said signal lines;

a second substrate including a counter electrode opposed to said pixel electrodes; and a liquid crystal layer held between said first and second substrates;

wherein said first substrate further includes pairs of first and second shield electrodes each formed along one signal line and arranged to alternately overlap one and another of two adjacent pixel electrodes which are located between two adjacent scanning lines and between the two adjacent pixel electrodes, said first and second shield electrodes of each pair are associated with said one signal line to form a light-shielding member which shields light transmitted through a gap between said adjacent pixel electrodes, said first shield electrode is formed to mask a liquid crystal disclination region present on a side corresponding to one of said adjacent pixel electrodes, and said second shield electrode is arranged to overlap another one of said adjacent pixel electrodes.

17. A liquid crystal display device according to claim 16, wherein said first and second shield electrodes extend from a storage capacitance line formed in parallel with said adjacent scanning lines.

* * * * *